United States Patent [19]
Johansen et al.

[11] Patent Number: 5,479,287
[45] Date of Patent: Dec. 26, 1995

[54] SWITCHABLE OPTICAL NETWORK WITH IMPROVED TRANSMISSION ABILITY

[75] Inventors: Lars Johansen, Stockholm; Jonas Claesson, Bandhagen, both of Sweden

[73] Assignee: Telia AB, Farsta, Sweden

[21] Appl. No.: 174,261

[22] Filed: Dec. 28, 1993

[51] Int. Cl.$^6$ .................................................. H04J 14/02
[52] U.S. Cl. ........................................ 359/128; 359/118
[58] Field of Search .......................... 359/118–121, 125, 359/128, 137, 117, 152, 164, 168; 388/24; 370/60.1

[56] References Cited

U.S. PATENT DOCUMENTS

| | | | |
|---|---|---|---|
| 4,873,681 | 10/1989 | Arthurs et al. | 319/123 |
| 4,957,340 | 9/1990 | Kirkby | 356/96.16 |
| 4,975,899 | 12/1990 | Faulkner | 370/4 |

FOREIGN PATENT DOCUMENTS

| | | |
|---|---|---|
| 2199209 | 6/1988 | United Kingdom . |
| 2198903 | 6/1988 | United Kingdom . |
| 2224902 | 5/1990 | United Kingdom . |
| 2227623 | 8/1990 | United Kingdom . |
| 90/09710 | 8/1990 | WIPO . |

OTHER PUBLICATIONS

Li et al., "Architecture And Protocol of a Passive Optical Packet–Switched Metropolitan/Wide Area Network Using WDMA" GLOBECOM '92 Communications for Global Users. IEEE Global Telecommunications Conference Conference Record vol. 3, pp. 189–203, 6–9 Dec. 1992.

*Primary Examiner*—Leo H. Boudreau
*Assistant Examiner*—Kinfe-Michael Negash
*Attorney, Agent, or Firm*—Oblon, Spivak, McClelland, Maier & Neustadt

[57] ABSTRACT

The present invention relates to an optical network with a number of nodes. Information is transmitted and, respectively, received in the nodes. The information is transmitted over a number of frequencies. Receiving and, respectively, transmitting of frequencies in the nodes is variable. The information is only converted to electrical signals in those nodes where the information is retrieved. Optical signals are amplified and distributed in the network via optical splitters and amplifiers. The capacity in the network can be redistributed depending on the capacity requirement in different parts of the network.

5 Claims, 8 Drawing Sheets

SWITCHABLE OPTICAL NETWORK WITH IMPROVED TRANSMISSION ABILITY

TECHNICAL FIELD

The present invention relates to optical networks which are used, for example, for communications transmission. The optical network includes terminals and one or more networks which interact. The optical network has an information capacity which is predetermined.

PRIOR ART

Optical networks have been previously known. In these, each node is allocated a number of channels with a predetermined frequency. Furthermore, each node can obtain access to one or a number of channels via filters or demultiplexers. Each of the nodes transmits to the network, which distributes each channel to all nodes. Individual nodes select a required channel by selecting with frequency division multiplexing or time division multiplexing. Furthermore, it is known to use hierarchical networks with active and passive star couplers.

Examples of the above situations are given in patents GB 2 114 902, U.S. Pat. No. 4 957 340, U.S. Pat. No. 4 957 899, WO 90/09710 and GB 2 199 209.

TECHNICAL PROBLEM

In optical communication networks, among others, there is a need for changing the utilisation of capacity, between different points in the network, in dependence on the information requirement between respective points in the network.

During the transmission of information in optical networks, there is a need, for information users in the network, to separate relevant information from irrelevant information. In this regard, it is desirable that signals are separated in the optical phase rather than in the node.

There is also a need for users to have access to all of the information which is accessible an the network. For example, the handling information from a plurality of sources at the same time is a desirable result.

There is also a need for reusing the same frequency in different parts of the network for different requirements. This presupposes that there are no conflicts for the same frequencies.

There is also a need for nodes in the optical network to be able to receive and, respectively, send out a plurality of frequencies. In this connection, there is a requirement that the receiving equipment and, respectively, transmitting equipment of the nodes can be switched over to different frequencies.

In an optical network, it is desirable to minimise the number of band width-limiting elements such as optical filters. Each optical band-limiting element entails an undesirable degeneration of the band widths, which must be avoided.

It is desirable for accessible channels in the optical network to be reusable.

It is also desirable that the network can utilise future technical developments.

It is also desirable to minimise the accumulated spontaneous noise from the amplifiers in the network.

The invention specifies a solution for the problems described above.

SUMMARY OF THE INVENTION

The present invention provides a method and arrangement for flexibly utilising capacity in an optical network. A number of nodes is arranged in the network. Each node is allocated a number of frequency-variable transmitters and receivers. This arrangement allows each node to be adjusted for transmission and, respectively, transmission at arbitrary frequencies. The choice of frequencies is only limited by the frequencies allocated to the system.

An optical signal is only taken out, terminated, in the nodes where the respective signal is to be utilised.

In the network, the nodes are connected via optical power splitters. The total capacity in the optical network is movable between different nodes in dependence on the capacity requirement between different nodes. The movability is made possible by the receivers selecting the information which is to be received. The selection is made by the receivers selecting the frequencies which correspond to information channels which are intended for the node.

The arrangement has the consequence that the transmission capacity which is not utilised in a node is released and redistributed to other nodes in the network. Information which is sent out in the network can be received in receivers of all nodes. All information which has been sent out in the network thus becomes accessible in all nodes.

The ability to move the transmission capacity in the network has the consequence that it is possible to adapt the capacity in individual point-to-point connections in accordance with the prevailing traffic situation.

Frequency selection in the nodes is done by optical filtering or optical switching. This has the consequence that the optical signals are only converted into electrical signals at the points where the respective signals are terminated and utilised. An optical signal which reaches a node where it is not be utilised is just forwarded an the network with only optical switching or optical filtering. Thus, an optical network using optical splitters and optical amplifiers is produced. Splitters set out in the network are allowed to have an arbitrary and asymmetric placement. With this arrangement, the optimal utilisation of the amplifiers in the network is obtained.

The method also permits cascade connecting of frequency filters to be avoided.

In those cases where two nodes direct their information to different receivers, it is possible to utilise the same frequency or wavelengths, for different purposes in different parts of the network.

Electronics in optical networks normally constitute a limiting factor. This problem is avoided by eliminating the conversions to electrical signals that would be taking place in the transmission between the nodes in the network.

PREFERRED EMBODIMENT

Figure 1:
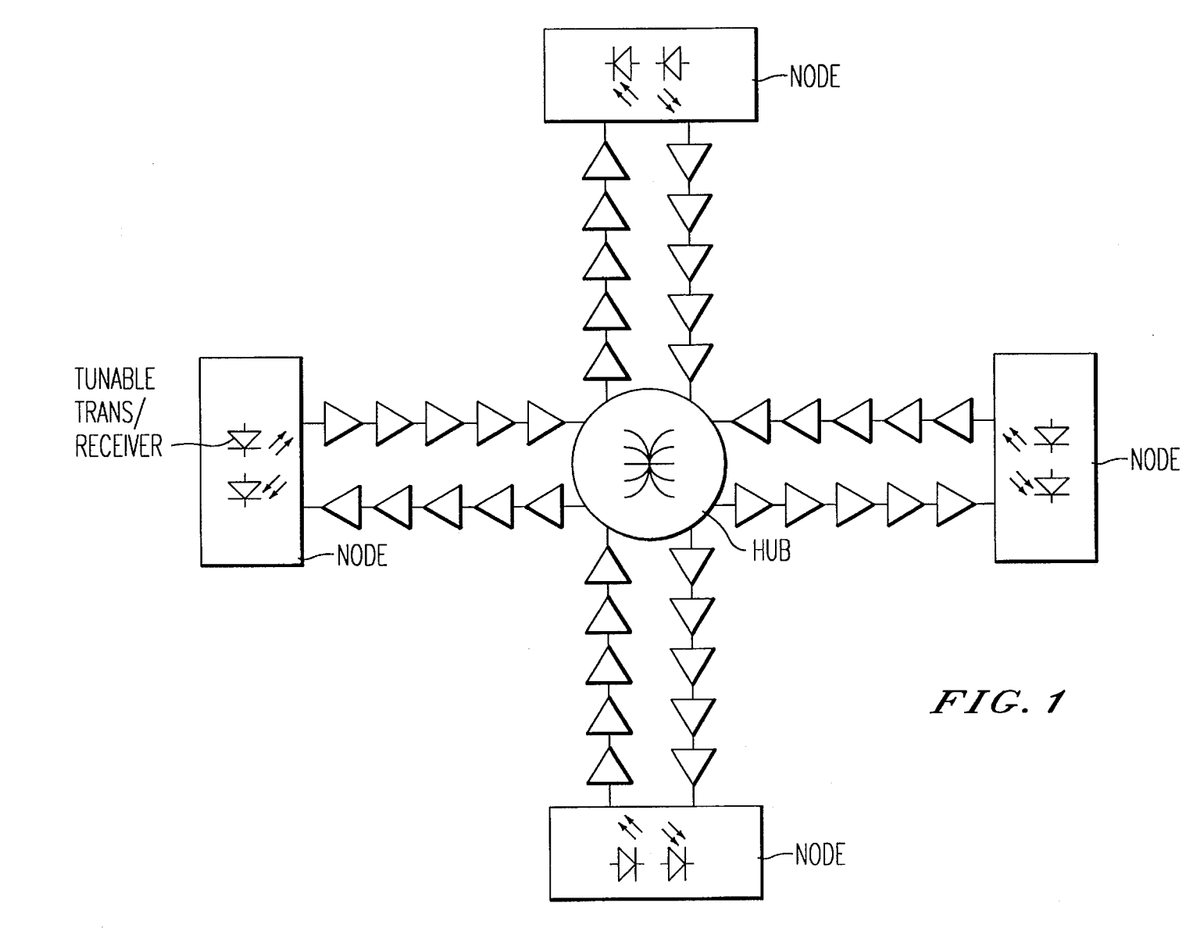
FIG. 1 shows an example of a star-shaped network.

Optical networks for different application purposes are configured in different ways. An example of this is given in FIG. 1, where a star-shaped configuration is given. A different configuration is given in FIG. 2, where channels are directly connected between the different nodes in the network. Networks connected together in accordance with FIG. 1 are vulnerable in the sense that if the connection in one link is broken, this link has no contact with the remaining network. In network configurations according to FIG. 2, a break in a link is not synonymous with the communication in this link being broken with the remaining network. This is because the communication can be directed along other routes to the said link in this case. The present invention can be utilised in, among others, network configurations described above and other possible network configurations.

Figure 2:
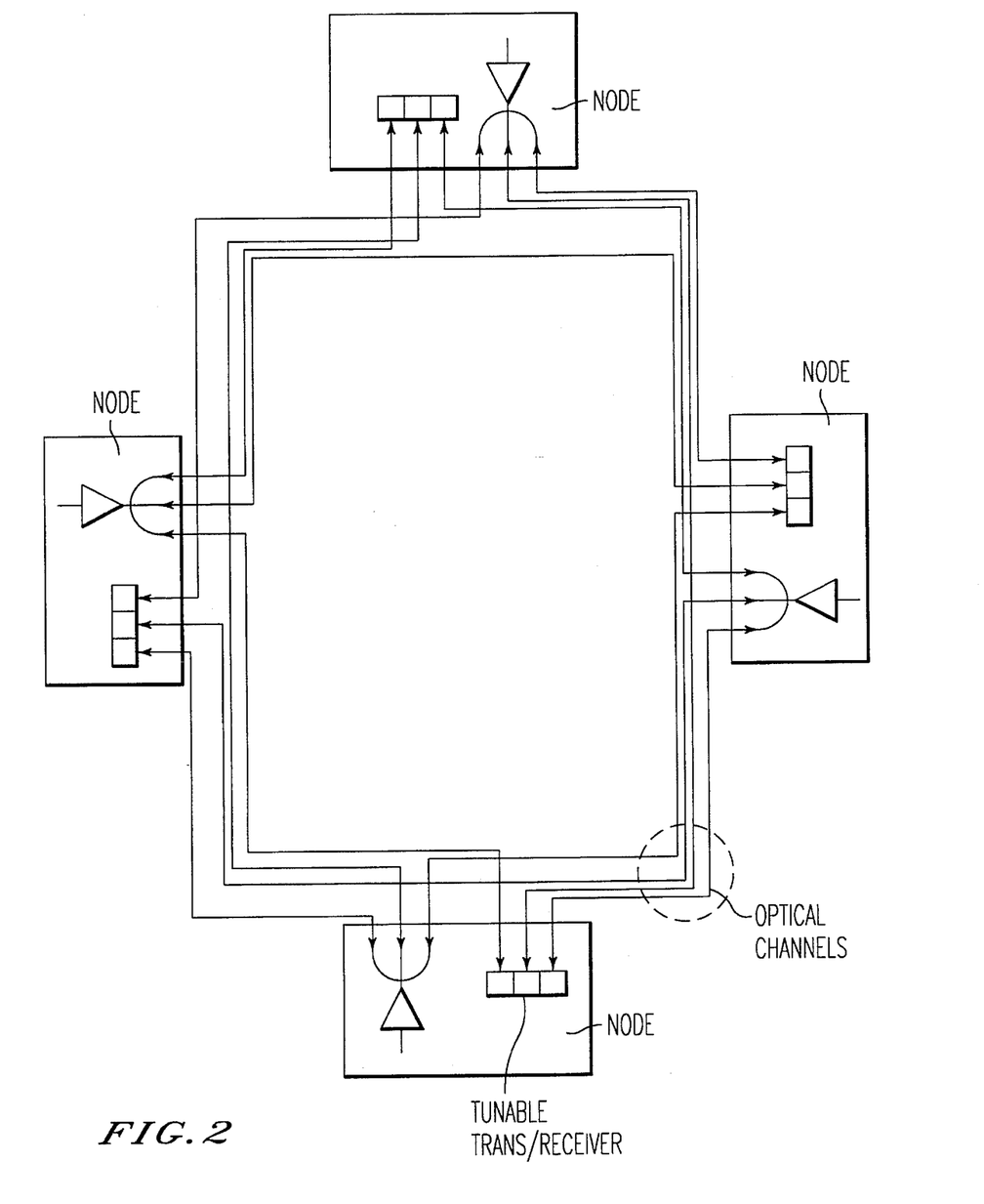
FIG. 2 shows an example of an optical network with a number of nodes. In the nodes, receivers and transmitters are specified. Furthermore, examples of interconnection between the nodes are shown.

In an optical network according to FIG. 1 or FIG. 2, a number of nodes, amplifiers and splitters is included. The ability to transmit information in the network depends on the capacity of the optical network and the number of accessible channels.

Each node is provided with a number of transmitters and receivers. The said transmitters and receivers are utilised for communication between the different nodes in the network. A node which establishes contact with another node sends out a request for contact. The network allocates suitable frequencies to the nodes for the communication. The frequencies in question can be utilised exclusively by the two nodes or shared with other nodes in which case only certain channels in the selected frequencies are utilised by the two nodes. The information can also be transferred at the same time to several nodes for processing.

The transmitters and receivers of the nodes can be adjusted to different frequencies. Since an adjustment of the frequency selection in a respective node can be carried out, opportunities are provided to utilise the accessible frequency spectrum in the best manner.

When the nodes have agreed on which channels are to be utilised, the transmitters and receivers of the respective node are set to these frequencies. Information is sent out from the transmitter of one of the nodes. The said information is transferred in the network with or without a number of optical amplifiers. The receiver end receives the information and selects the information from other information which arrives. Separation of the information is carried out by only the frequency or frequencies being terminated which contain(s) information which the node is to receive. Depending on the equipment of the user, the optical signal is transmitted intact to the user or is converted to information which can be interpreted by the user. Conversion of the information to electrical signals is possible in this case.

Frequencies which are not processed in the node are forwarded from the node to the network in optical form. Frequencies are selected optically, whereafter those frequencies which are not to terminate in the node are forwarded in the network, after possible optical amplification.

In relatively large networks with different routings, for example different types of communication network, special nodes are arranged in the network. Information which reaches such a node is selected and forwarded in different traffic directions according to FIG. 3.

Figure 4:
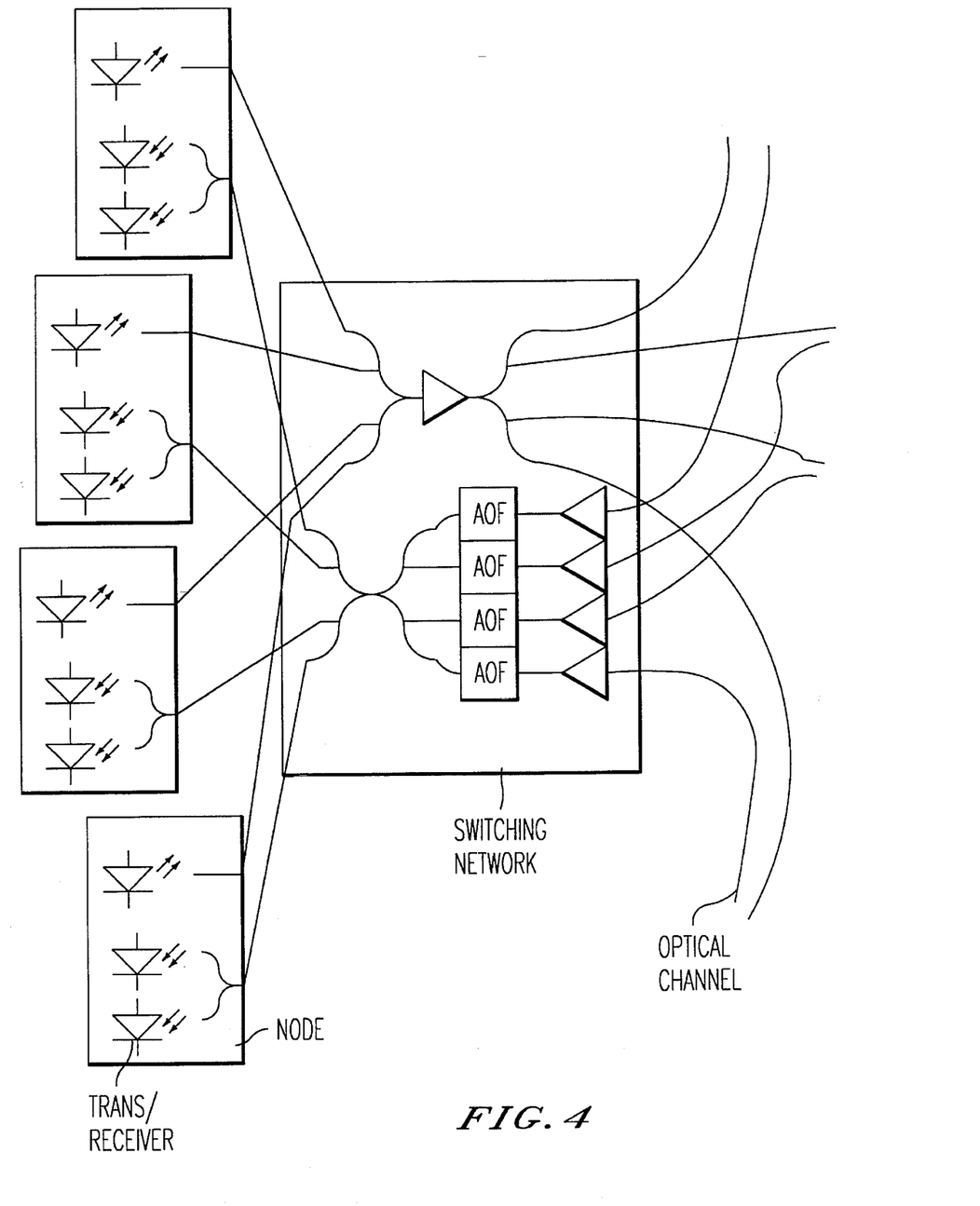
FIGS. 4–6 are examples of how regional collecting/switching nodes can be configured. Four local stations are connected to the switching nodes.
Figure 5:
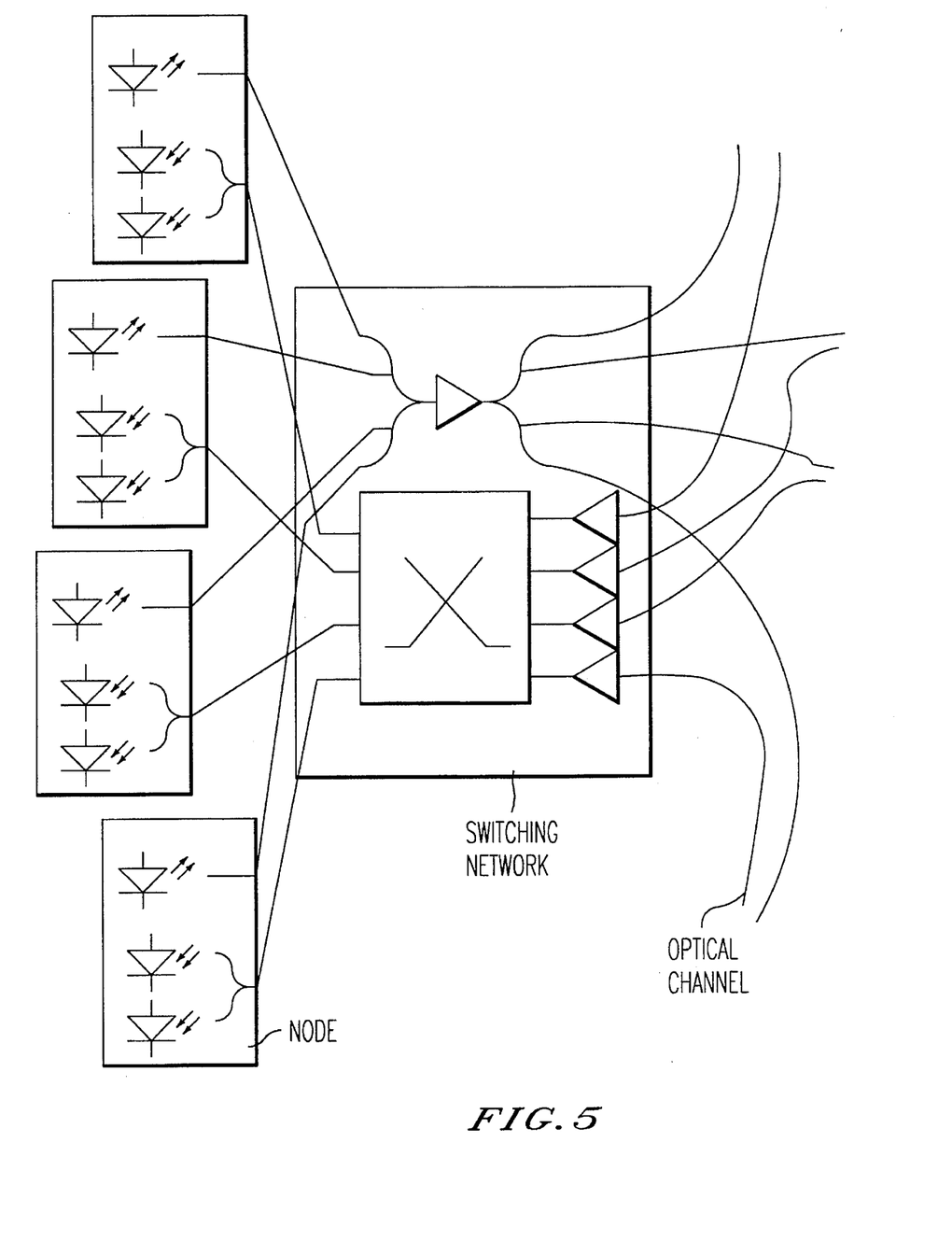
Figure 6:
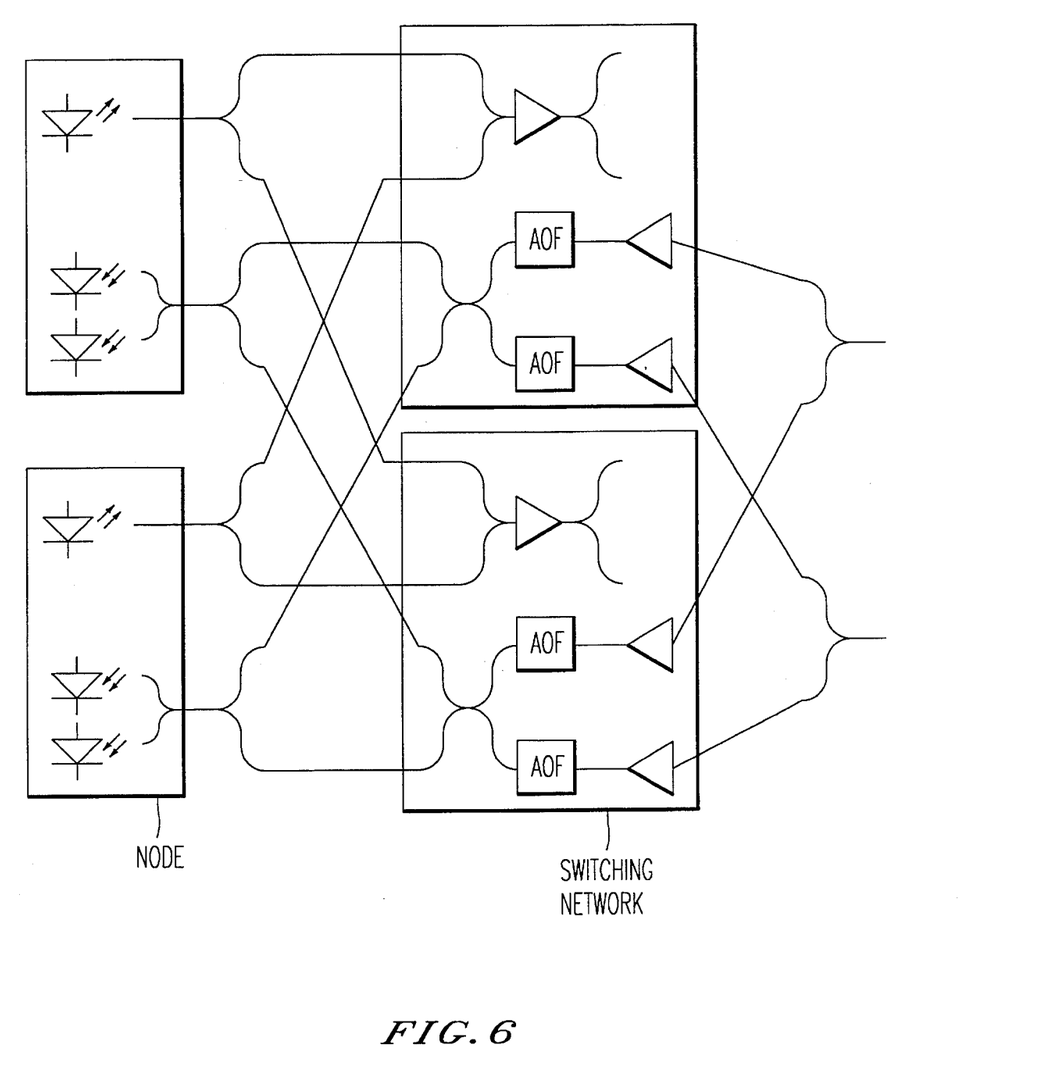

Information can also be brought together at certain junctions, which is shown in FIGS. 4–6. The information at such a junction is thereafter forwarded in the network. Thereafter, a distribution to different routes is carried out depending on the address of the information. This provides the possibility of directing information from different information providers to common receivers. In this context, it is possible to utilise different frequencies or common frequencies where each information provider is allocated certain channels.

Due to the fact that both transmitters and receivers in a respective node are adjustable, a respective node is not tied to using fixed, predetermined frequencies. This means that the information exchange between two nodes can be adapted, with regard to capacity, to the actual capacity requirement. A prerequisite is that accessible information channels allow this. For example, this involves a free channel or free channels being accessible to all nodes in the network. If two nodes communicate with one another without it being necessary for the information to be utilised by others in the network, the possibility is given to others in the network to utilise the same frequency for a different purpose. The possibility of doing this is provided by special nodes, distribution nodes, in the network directing respective information volumes between respective nodes without the items of information crossing one another.

Figure 3:
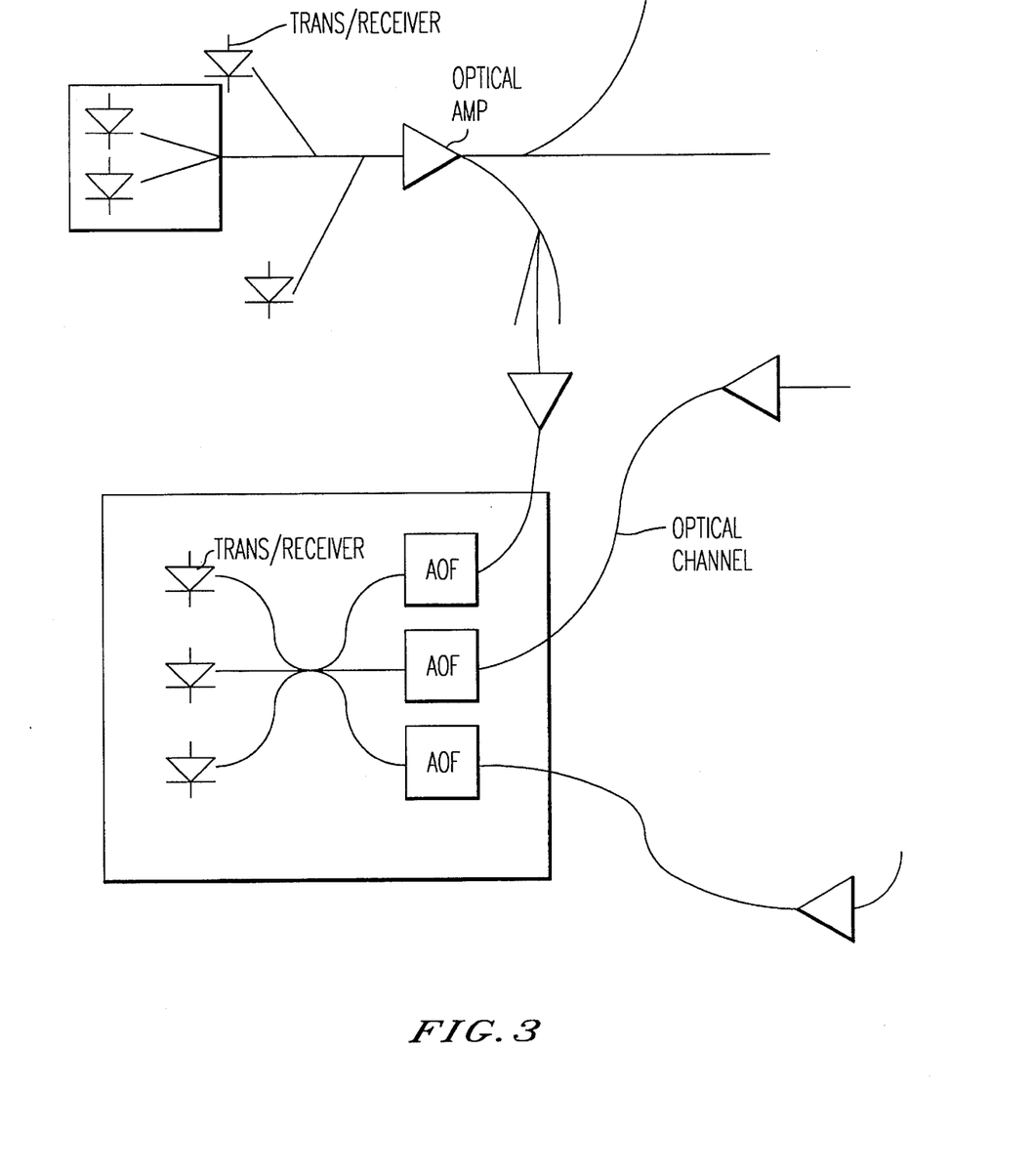
FIG. 3 gives an example how a part of a relatively large network can be configured.

In FIG. 3, an example is shown of asymmetric placement of splitters in a network. The network can be made up of communication networks, for example a nationwide telephone network. The figure shows that information which is sent out is distributed to different traffic routes.

FIGS. 4–6 show examples of how regional collecting/distribution nodes can be configured. In a telecommunications network, the figures mirror how four switching stations are connected to the distribution node. It can be seen how information from the four switching stations is brought together in the distribution node. Thereafter, the distribution node distributes the information to different routes in dependence on where the information is addressed. This means that information with the same address from each of the switching stations is brought together to one or more information channels in the switching node. The information channels are composed either of channel parts in one or more frequencies or of all the channels in one frequency.

According to FIGS. 4–6, incoming traffic arrives at the switching node from different sources. The information is brought together and distributed by the switching node to the different switching stations.

In complicated networks, the invention described here allows, on the one hand, fixed predetermined frequencies to be utilised in the network and, on the other, frequencies to be utilised jointly where there is a requirement. The common frequencies are distributed in dependence on the prevailing traffic situation between the users.

The arrangement includes an optical information network, for example a telephone system, data network and so forth. The structure of the network can be simple or complicated. For the simple case, FIG. 1 and FIG. 2 constitute examples of conceivable configurations. The network consists of a network which can transmit frequencies in the light range. A number of nodes are arranged in the network. Users are connected to the nodes. Communication between the node and the user is carried out by optical or electrical means depending on the equipment of the user.

One or more users can be connected to one node. A user at a node wishes to establish contact with a user in another node. For this, his own node is called, which node receives information about the address of the other party (parties). The nodes communicate with one another and investigate which channels and frequencies are available. When it has been agreed which frequencies are to be utilised for transmission and, respectively, reception by the respective user, the transmission and receiving equipment of the respective node is set to the allocated frequencies.

The ability to adjust the transmitter and, respectively, receiver of the nodes to the current frequencies is provided by the fact that the said transmitter and receiver are frequency-variable. To cover the communication requirement of the node, the latter is additionally provided with a plurality of transmitters and receivers. This means that a plurality of users and, respectively, nodes, can be connected to one node.

Information which arrives at a node is sent out into the network. In a network configuration according to FIG. 1, the information is distributed to a central point where all information meets and is distributed to respective users. Information from different nodes is brought together and distributed to the different traffic routes depending on where the information is to be transmitted. In the node which receives the information, a distribution takes place thereafter to users who are connected to the node. The transformation of an optical signal to an electrical signal only takes place between a respective node and a user who is connected to this node.

Transmission in the network between the nodes takes place exclusively by optical means. In certain nodes, distribution nodes, a redistribution takes place of incoming frequencies to different traffic routes/traffic directions. The selection of which frequencies are to terminate in the node, respectively be redistributed in the network, takes place by means of optical filtering and/or optical switching.

Information which is sent out in the network can be received by all nodes in the network. In those cases where information within specific frequencies is not of interest to certain nodes, the network is given the possibility of utilising these frequencies for communication between other nodes in the network. This presupposes that the information items between respective node groups are not in conflict with one another. This possibility of reusing frequencies for different purposes is of great significance in relatively large networks such as telecommunications networks, data networks and so forth. In this way, the usable capacity of the network is considerably increased. A factor contributing to the optimum utilisation of the network is also the ability to change frequencies in the different nodes in accordance with the total requirement for communicating in the network.

In a communication in a network according to FIG. 2, direct communication channels are established between the nodes in the network. If one imagines that FIG. 1 and, respectively, 2 illustrate a nationwide information network, the specified nodes constitute points where transmission to different parts in the network is possible. In this connection, only relevant information is, of course, to be transmitted in this part of the network. Each of the nodes in FIG. 1 and 2 is in contact with a number of regional nodes, configured, for example, according to FIGS. 3–6. The regional nodes, in turn, are connected to a number of local nodes which are subordinate to the respective regional node. Regional nodes are provided with communication lines between themselves in accordance with FIG. 3. In the same way, the local nodes have connections between themselves for local communication exchange.

Directing of the traffic between different parts in the network takes place in distribution nodes. Such distribution nodes can be located at strategic points in the network.

Amplifiers are also placed in the network and in the nodes in order to amplify the optical signals in the network.

Distribution, splitting, of signals is allowed to take place in distribution nodes located arbitrarily in the network.

Distribution of information in the network also takes place in splitters. All information which arrives at a splitter is distributed to a number of traffic routes. The information which is sent out on a respective traffic route is in this case identical to the information which arrived at the splitter.

The structure of the network allows for all information to be accessible everywhere in the network, if this is desired. It is also possible to change the utilisation of capacity in the different parts of the network by redistributing utilised channels in the different parts of the network.

Each node also takes up only that information which is needed. This takes place by means of filtering or optical switching.

Cascade coupling of frequency filters is avoided. As can be easily seen by the expert, the above description can be developed and utilised in many different configurations. To build up, in this way, complete telecommunications networks, data networks and so forth with complicated traffic ramifications does not present any difficulties.

The invention proposes a concept based on a trunk network with asymmetrically located power splitters. The advantage of this structure is dynamic band width allocation, frequency reuse and an easy transfer from today's network, for example SDH/SONET, to future systems, for example HDWDM.

Optical systems have developed immensely during the last decade. WDM components, and tunable lasers and filters have made network structures possible which utilise the high transmission capacity of fibres for switching and routing functions. Conventional point-to-point connections with electrical switching and routing are not necessarily the most effective network structures.

A passive star network can fulfil these requirements but there will always be a definite number of channels in the star network. A critical point in the network is the centre of the star, where all traffic in the network must pass through. There are also clear limits to the splitting ratios and distances.

Figure 7:
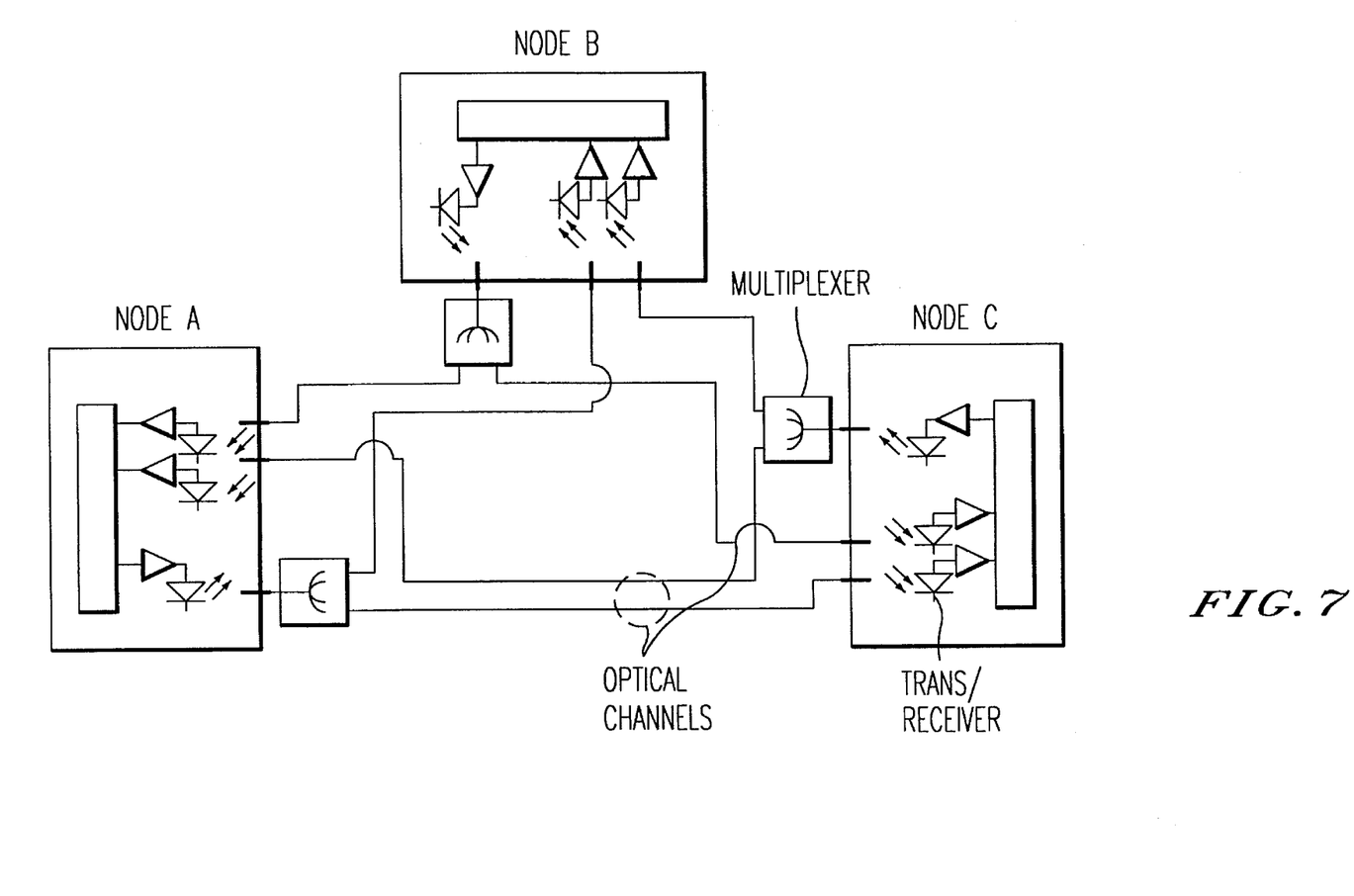
FIG. 7 illustrates an optical multipoint-to-multipoint network wherein signals are distributed via asymmetrically located splitters.
Figure 8:
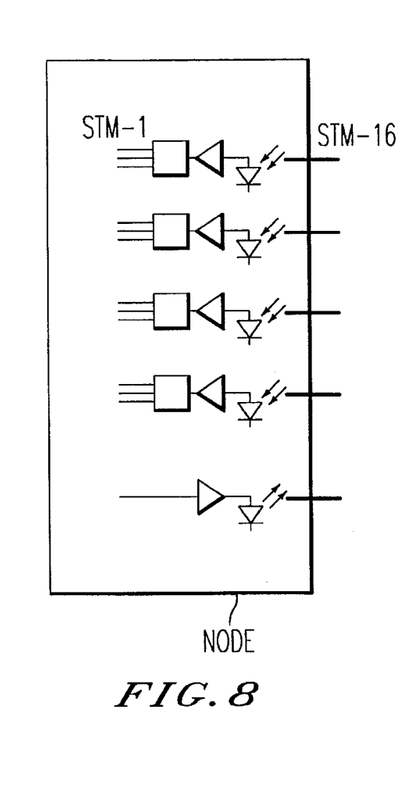
FIG. 8 illustrates a typical node structure for a TDM network.
Figure 9:
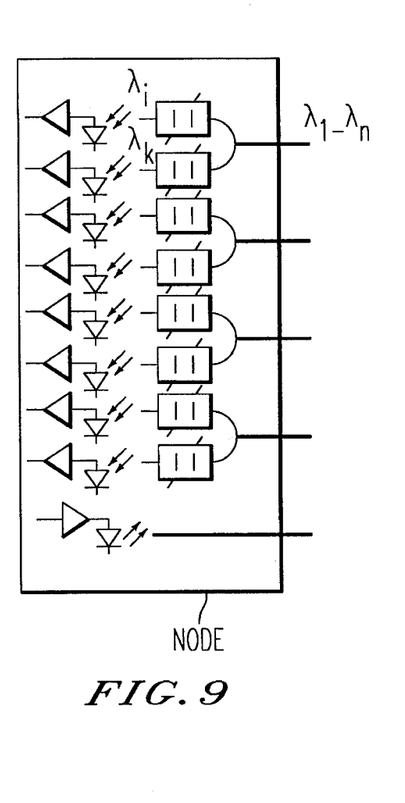
FIG. 9 illustrates a typical node structure for a WTN network.
Figure 10:
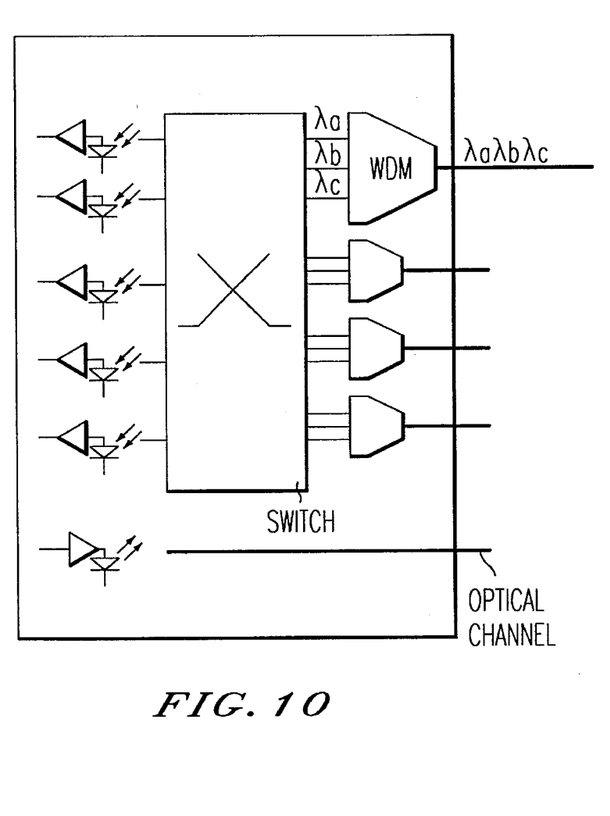
FIG. 10 illustrates a network node including switching fabric.

FIG. 7 shows a fundamental optical multipoint-to-multipoint network, but, instead of a passive central star coupler, the signals are distributed via asymmetrically located splitters. A typical node connection consists of an outgoing fibre and several incoming fibres to each of the other nodes, due to the asymmetry. This provides each node with access to all the information which has been sent out in the network. Switching and routing functions are obtained by selecting the information placed in the receivers. The selection of information in a receiver node, shown in FIGS. 7 and 8, utilises, for example, the time domain in demultiplexing parts in a SDH frame or in the frequency domain by selection of frequency channels. The introduction of optical switching elements makes it possible to switch incoming channels to any receiver. This optimises the number of receivers and increases the band width flexibility.

The structure of the optical multipoint-to-multipoint network has a high flexibility and the network capacity is efficiently utilised since it is shared by all nodes. Band widths are dynamically allocated to the nodes in the network. The flexible capacity distribution simplifies protective switching. Switching and routing functions do not presuppose any band-limiting components in the network. Both point-to-point and point-to-multipoint traffic are provided for.

In contrast to a typical optical multipoint-to-multipoint network, the distributed splitter function provides advantages such as scalability, wavelength reuse and network reliability. The network is also scaleable with respect to distance and number of nodes which use optical amplifiers. By taking advantage of both conventional TDM technology and more future-oriented WDM technology, the proposed structure represents a prospective network, the topology of which is easily transferred from today's SDH/SONET to tomorrow's WDM/HDWDM by only updating the node equipment.

By building networks with the proposed structure, it is possible to utilise the flexibility offered by optics, and thereby to obtain future advantages in the fibre structure, dynamic band width allocation and HDWDM upgradability.

The invention is only limited by the patent claims specified below.

We claim:

1. An optical system for carrying data comprising:
   a plurality of nodes;
   at least one optical channel connecting the plurality of nodes;
   contained within each of said nodes a plurality of independent optical transmitters/receivers each of which is adjustable so as to be tunable to operate on different frequencies;
   a plurality of splitters for said optical channel(s) so as to provide independent optical paths to said plurality of nodes; and
   means to selectively switch each of said splitters independently from each other and in response to traffic on the system.

2. A system as in claim 1 wherein the number of splitters is different from the number of nodes.

3. A system as in claim 1 wherein said splitters are asymmetrically located in said system.

4. A method of utilizing an optical system having a plurality of nodes, at least one optical channel connecting the plurality of nodes, contained within each of said nodes a plurality of independent optical transmitters/receivers each of which is adjustable so as to be tunable to operate on different frequencies, a plurality of splitters for said optical channel(s) so as to provide independent optical paths to said plurality of nodes comprising the steps of:
   selecting an unused frequency by a node;
   tuning at least one of the tunable transmitter/receivers for said node to the unused frequency selected;
   transmitting data on said transmitter/receiver and an optical channel using the at least one tunable transmitter/receiver; and
   selectively switching each of said splitters independently from each other and responsively to traffic on the system.

5. A method as in claim 4 wherein the step of selecting is by filtering the frequency to be used.

* * * * *